Feb. 12, 1957 W. C. EDDY 2,781,146
CLOSURE FOR PLASTIC CONTAINERS
Filed June 23, 1954
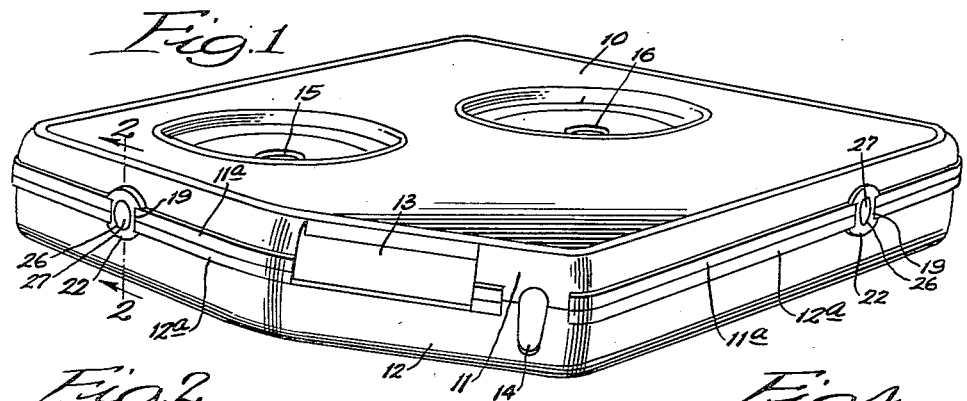
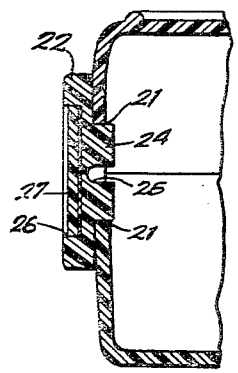
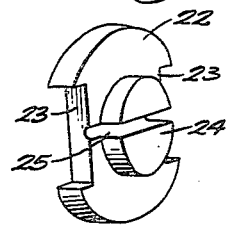
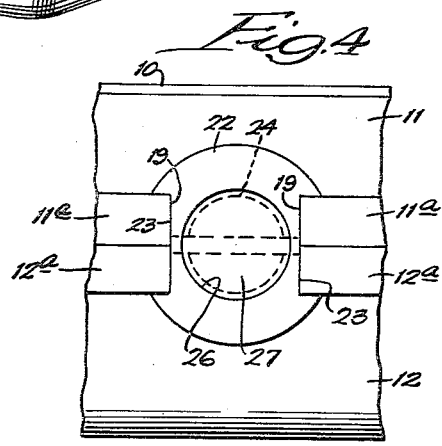
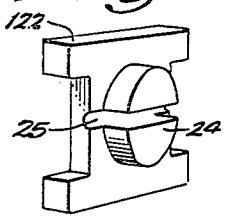
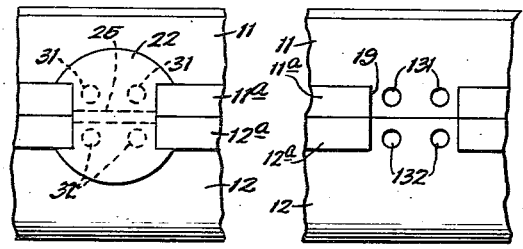
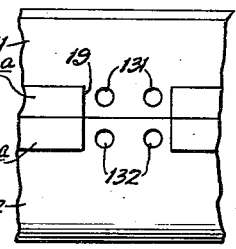
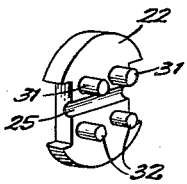
INVENTOR:
William C. Eddy,
BY
Ooms, McDougall, Williams & Hersh,
ATTORNEYS.

United States Patent Office 2,781,146
Patented Feb. 12, 1957

2,781,146

CLOSURE FOR PLASTIC CONTAINERS

William C. Eddy, Michigan City, Ind., assignor to Television Associates, Inc., Michigan City, Ind., a corporation of Illinois Application June 23, 1954, Serial No. 438,810

3 Claims. (Cl. 220—4)

This invention relates to plastic containers, and is concerned particularly with a secure and convenient closure means for such containers.

My invention is addressed particularly to plastic containers comprising a pair of mating members adapted to fit together around a periphery or rim and to act as an enclosure or container to protect from mechanical damage some relatively fragile or delicate material or apparatus.

An example of the type of plastic container under consideration is the film magazine shown in the appended drawing. Another example of such containers might be the plastic casings often used for housing delicate electronic equipment such as portable radio receivers. Still another example of such a plastic container is the casing in which a hearing-aid instrument is usually housed.

Often such a plastic container or casing should be sealed shut at the time it leaves the factory or service station, in order that its contents may be protected against careless handling by unskilled persons. For example, plastic film cartridges or magazines of the sort illustrated in the appended drawing are frequently used to house a so-called continuous or endless reel of film. When properly mounted in the first instance, such an endless reel will, if considerately treated, operate almost indefinitely without giving trouble. On the other hand, if persons unskilled in the art of working with such reels tamper with the film, it can very readily become snarled, creased, broken, or otherwise rendered useless.

The need for a sealed casing in such an application is clear. At the same time, it is obviously desirable that the casing be so constructed that it can be readily opened, and later re-sealed, by authorized persons, for purposes of service, substitution of new film, or repair of damage suffered in use. To provide such a sealed plastic container is one of the prime objects of this invention.

Plainly, it is also desirable that means be provided by which an authorized serviceman or factory representative can detect readily when or whether the casing has been opened or otherwise tampered with by unskilled or unauthorized persons, and it is likewise a great convenience to such a serviceman to be able, at a glance, to determine when or on how many occasions the particular casing has been opened for service by unauthorized persons. To provide a plastic casing or housing with those desirable characteristics is among other objects of my invention.

Specifically, I achieve a securely held plastic container by using a pair of mating plastic members as the principal structural components and providing, at suitably spaced intervals along the adjoined rim or periphery of the members, a plurality of button-like closure members adapted to be cemented in place and so shaped that they hold the structural members securely together in the intended mating or registering position, to provide a secure, tightly closed box.

In the preferred form of my invention, I provide the button-like closure members with a weakened zone, preferably along the line which is co-planar with the line of conjunction between the top and bottom of the container.

I also incorporate certain other novel and useful structural details in the preferred form of my invention, including a recess in the outer face of my closure members adapted to receive a wafer or disc of distinctive color which will permit the re-using of my plastic closure members if desired and will at the same time provide a convenient indication as to the service history of a particular container—that is, the number of times opened for service, or the place or time of such servicing.

While the specific embodiment of my invention shown in the drawing and described in detail in the subsequent paragraphs relates to a film magazine, it will of course be understood that all the foregoing remarks are equally applicable to plastic cases used for other purposes, such as hearing aids or other electronic equipment, and my invention therefore is not limited merely to film magazines.

In the drawing, Figure 1 is a perspective view of a film magazine illustrating my invention. Fig. 2 is a fragmentary sectional view taken along the line 2—2 of Fig. 1. Fig. 3 is a perspective view of a closure device according to my invention. Fig. 4 is a front elevation view of a portion of the film magazine of Fig. 1, bringing out the distinctive structure of my closure member. Fig. 5 is a perspective view of a closure member of modified shape but generally similar in function to the device of Fig. 3. Figs. 6 and 7 are fragmentary front elevation views showing respectively another modified form of closure device and the modification of the container appropriate for use therewith. Fig. 8 is a perspective view showing in greater detail the modified closure member of Fig. 6.

In Fig. 1, I have shown in perspective a plastic container or magazine 10, formed of a top member 11 and a bottom member 12, shaped to provide a mating fit around their outer rims. In the embodiment shown, each of the members 11 and 12 contains, around a portion of its rim, an outwardly extending flange, the flange on the top member being marked 11a and the flange on the bottom member being marked 12a.

In the example shown, the plastic casing is intended for use as a film magazine, with the result that it is provided with appropriate apertures 13 and 14 for entry and exit of the film, and with recessed apertures 15 and 16 adapted to receive the reel-supporting spindles of a projection machine. It will be understood that the structural details such as apertures 13—16 inclusive are merely incidental to the intended application of the device and form no part, per se, of my invention.

In the embodiment shown, at suitably spaced intervals around the rims of members 11 and 12, the flanges 11a and 12a are relieved to provide accomodation for my closure members presently to be described. Such relieved zones are shown in Fig. 1 at the points marked 19. It should be noted that the relieved zones of the respective flanges 11a and 12a are positioned so that they register with one another when the top and bottom portions of the box are in mating position.

The main plastic web of the top and bottom casing members will preferably be modified in the relieved zones 19, so as to provide a relatively great surface contact with the closure members mounted within the relieved zones 19. In the Fig. 1 embodiment, the web of both the top and bottom casing members is relieved in the zones 19 to provide semi-circular recesses 21. As may be seen from Figs. 2 and 4, the recesses 21 join together when the casing pieces 11 and 12 are in mating position to form a circular aperture or opening situated centrally of the zone 19 wherein the flanges 11a and 12a are absent.

Carried within each of the relieved zones 19 is a closure button or device 22. Button 22 will normally be made of plastic material, which may be generally similar to that used for casing members 11 and 12.

As may be seen most clearly from Figs. 2 and 3, closure device 22 is generally button-shaped, and is provided with a symmetrically disposed pair of recesses 23 providing a reduced-width zone proportioned to fit snugly into, and to fill, the space within one of the relieved zones 19 between the ends of the flanges 11a and 12a.

The top and bottom portions of the closure device 22 fit over and under the flanges 11a and 12a and thus, when device 22 is in position, lock the top and bottom casing portions together in their proper mating position.

Preferably, closure device 22 is provided with an inwardly extending boss 24 which is shaped to fit with reasonable snugness into the aperture formed by the semicircular recesses 21. The cooperating action of boss 24 and the recesses 21 helps to hold the closure device 22 securely in position and, at the same time, provides a greatly increased surface area between closure device 22 and the casing members 11 and 12. This added surface area is desirable, since the closure members 22 are normally cemented in place by the use of any suitable plastic cement, and the greater the area of contact between the closure member 22 and the casing members 11 and 12, the better in general will be the cement bond.

Preferably the closure device 22 is provided with a transverse slot 25 extending completely across the button 22 between the two recesses 23, so as to provide a weakened zone in closure 22 which, when the closure device is in its proper position, will be in alignment with the abutting edges of the casing members 11 and 12.

The front face of closure device 22 is provided with a shallow recess 26, which may be circular or have any other desired shape. Recess 26 reduces the effective thickness of closure 22 along most of the length of slot 25.

Hence the depth of slot 25 will depend on whether recess 26 is employed. If so, slot 25 will necessarily be somewhat shallower than if recess 26 is not used.

Carried within recess 26 there may be provided a wafer or disc 27, which is preferably made of plastic material generally similar to that of which the closure 22 is formed. Wafer 27, if used, may be cemented in place by plastic cement.

While a wafer 27 may be employed with each of the closure members 22 as an original component thereof, a most useful application for the wafers 27 occurs when a casing 10 is returned to the factory or a service station for servicing. When, in that connection, the closure members 22 are removed, they will normally be broken along the line of weakness created by slot 25. When the contents of the container 10 have been given the necessary attention by the serviceman, the casing 10 may then be re-sealed. It may be that the serviceman will be provided with new closure members 22, but if he does not have new closure members at hand, the re-sealing may be accomplished with the old closures 22, simply by cementing a wafer 27 into position as shown in Fig. 2. Thus reinforced by a wafer 27, a closure member 22 will serve as a strong and secure seal for the casing 10, even though it may have been fractured along the line of weakness above mentioned.

In any event, even if the serviceman is provided with fresh closure members for use in re-sealing the casing, it will be desirable for him to insert in recess 26 a wafer 27, so that the wafer, by its color or legend carried thereon, may supply for future reference information as to the date on which it was given service, the nature of the work done, or the place performed.

It will of course be understood that when a box is subsequently reopened after having been sealed by closures equipped with the wafers 27, the action of prying loose the cemented closures 22 will ordinarily break the wafer 27 along the line corresponding to slot 25 or, at least, will cause wafer 27 to come loose and spring out of recess 26.

As Fig. 5 shows, the shape of the closure member 22 need not be generally circular. The closure member 22 shown in Fig. 5 is functionally the same as that of the closure 22 of Figs. 1–4, but it is provided with rectangular top and bottom portions.

Persons skilled in the art will readily appreciate the fact that the flanges 11a and 12a may be replaced by other modifications in the contour of casing members 11 and 12 so as to provide a closing or sealing grip on the respective casing members by the closure device 22. Thus, for example, instead of having the flanges as shown, the casing members may be provided with molded-in recesses shaped to accomodate the upper and lower portions of the closure device 22.

From the point of view of convenience in inserting and removing the closure devices 22, the arrangement shown, wherein the closure devices engage external flanges, is highly satisfactory. With that arrangement, the closure devices can be easily inserted and cemented in place, and, when their removal is desired, a knife edge may conveniently be inserted between the closure member 22 and the outer surface of the box or casing to provide the necessary prying action to fracture and dislodge the closure device 22.

In Figs. 6–8, I have shown an alternative arrangement which is easy to mold and which provides an even greater degree of security of closure. Hence the modification of Figs. 6–8 is particularly useful in applications wherein it is especially important that unauthorized access to the interior of the casing be prevented. In the arrangement of Figs. 6–8, the closure member 22 is generally similar to that shown in Fig. 3, except that the boss 24 is replaced by a plurality of pins 31 and 32, the pin or pins 31 being on one side of the slot 25 and the pin or pins 32 being on the other side.

The casing members designed for use with a closure member of the type shown in Fig. 8 may be similar in structure to the casing of Figs. 1–4 except that the semicircular recesses 21 in the relieved zones 19 are replaced by small holes 131 and 132, respectively disposed for registration and coaction with pins 31 and 32.

As will be readily understood, and as is shown in Fig. 6, a closure device 22 of the type shown in Fig. 8 can readily be cemented into position to seal together casing members 11 and 12, with a cement bond being formed directly between the pins and their corresponding apertures as well as between the body of the closure device and the respective casing members. Thus sealed, the closure member 22 can be removed only by use of considerable force, since the locking action of the closure device 22 on the flanges 11a and 12a is reinforced by the locking action of the pins 31 and 32 with their corresponding apertures 131 and 132.

If desired, an arrangement such as shown in Fig. 8 may be employed instead of using externally extending flanges on the casing members or cooperating recesses formed in the casing members as mentioned in the preceding paragraph. Regardless of the particular type of locking arrangement used, the weakened zone formed by slot 25 and the re-sealing means afforded by recess 26 and wafer 27 will be found most advantageous.

While I have, in the present specification, described in considerable detail certain specific embodiments of my invention, it is to be understood that such description is merely exemplary. Persons skilled in the art may make many modifications and changes in the structures shown without departing from the spirit and objectives of my invention.

I claim:

1. In a plastic casing comprising a pair of molded plastic members mating together along a peripheral rim, said rim on each member being provided with an outwardly extending flange, each of said flanged rims having at least one relieved zone, the relieved zone on one of said members being positioned to register with the relieved zone on the other member, a closure device adapted to hold said members together in mating position, said device being generally button-shaped and having a reduced-width portion fitting snugly into said registering relieved zones, said device having outwardly extending portions above and below said reduced-width portion engaging said flanges of said respective members, and said closure device having on its inner face at least one surface cooperating with the surfaces of the casing members for facilitating the cementing of said closure device to said members.

2. In a plastic casing comprising a pair of molded plastic members mating together along a peripheral rim, said rim on each member being provided with an outwardly extending flange, each of said flanged rims having at least one relieved zone, said relieved zone on one of said members being positioned to register with the relieved zone on the other member, a closure device adapted to hold said casing members together, said device being generally button-shaped and having a reduced-width portion fitting snugly into said registering relieved zones, said closure device having outwardly extending portions above and below said reduced-width portion engaging said flanges of said respective members, said closure device having also a transverse reduced-strength zone positioned in substantial alignment with said adjoined rims when said closure device is positioned in said relieved zones, and having also on its inner face at least one surface cooperating with the surfaces of said casing members for facilitating the cementing of said closure device to said members.

3. In a plastic casing comprising a pair of molded plastic members mating together along a peripheral rim, said rim on each member being provided with an outwardly extending flange, each of said flanged rims having at least one relieved zone, said relieved zone on one of said members being positioned to register with the relieved zone on the other member, a closure device adapted to hold said casing members together, said device being generally button-shaped and having a reduced-width portion fitting snugly into said registering relieved zones, said closure device having outwardly extending portions above and below said reduced-width portion engaging said flanges of said respective members, said closure device having on its inner face a transverse slot providing a reduced-strength zone extending across the major portion of the width of said closure member, said closure member having also a shallow recess on its outer face adapted to receive a wafer insert, said closure member being normally cemented to said casing members with said reduced-width zone occupying said relieved zones and said extending portions in engagement with said flanges.

References Cited in the file of this patent

UNITED STATES PATENTS

| | | |
|---|---|---|
| 453,695 | Griscom | June 9, 1891 |
| 1,284,291 | Fort | Nov. 12, 1918 |
| 2,630,936 | Freygang | Mar. 10, 1953 |